(12) United States Patent
Housholder et al.

(10) Patent No.: US 10,721,058 B2
(45) Date of Patent: Jul. 21, 2020

(54) ULTRA-SECURE BLOCKCHAIN ENABLED ANALYTICS

(71) Applicants: Charlie Housholder, Durham, NC (US); Jordan White Chaney, Durham, NC (US); William Krut, Durham, NC (US); Christian Nimsch, Raleigh, NC (US); Bryce Nelson Chaney, Swansboro, NC (US)

(72) Inventors: Charlie Housholder, Durham, NC (US); Jordan White Chaney, Durham, NC (US); William Krut, Durham, NC (US); Christian Nimsch, Raleigh, NC (US); Bryce Nelson Chaney, Swansboro, NC (US)

( * ) Notice: Subject to any disclaimer, the term of this patent is extended or adjusted under 35 U.S.C. 154(b) by 91 days.

(21) Appl. No.: 16/173,483

(22) Filed: Oct. 29, 2018

(65) Prior Publication Data

US 2019/0342074 A1 Nov. 7, 2019

Related U.S. Application Data

(63) Continuation-in-part of application No. 15/227,368, filed on Aug. 3, 2016, now Pat. No. 10,114,969.

(60) Provisional application No. 62/200,670, filed on Aug. 4, 2015.

(51) Int. Cl.
*G06F 21/62* (2013.01)
*H04L 9/06* (2006.01)
*G06F 21/60* (2013.01)

(52) U.S. Cl.
CPC .......... *H04L 9/0637* (2013.01); *G06F 21/602* (2013.01); *G06F 21/6218* (2013.01); *H04L 9/0643* (2013.01); *H04L 2209/38* (2013.01)

(58) Field of Classification Search
CPC ............. G06F 21/6218; G06F 21/6272; H04L 63/0428
See application file for complete search history.

(56) References Cited

U.S. PATENT DOCUMENTS

| | | | | |
|---|---|---|---|---|
| 9,998,539 B1* | 6/2018 | Brock | ................. | G06F 11/1076 |
| 10,348,505 B1* | 7/2019 | Crawforth | ............... | H04L 9/321 |
| 2016/0261404 A1* | 9/2016 | Ford | ..................... | H04L 67/104 |
| 2016/0292178 A1* | 10/2016 | Manville | ............. | G06F 16/1752 |
| 2018/0191502 A1* | 7/2018 | Karame | ............. | G06F 21/6245 |

* cited by examiner

*Primary Examiner* — David J Pearson
(74) *Attorney, Agent, or Firm* — John L. Sotomayor (57) ABSTRACT

A system and method for analyzing and reporting on data held within a secure blockchain without decrypting information from the blockchain is provided. Incoming information and data files may be encrypted using any preferred method of encryption, with a hash created by an AI process for the data within the data files prior to encryption. A second hash is created after encryption is performed on the first hash, with an association string created to directly relate the first hash values with the second hash values. Metadata about the hashed data is analyzed with the information directly relatable to each of the first and second hash data, with the analytic information provided in a report to a user. The user decides what data to retrieve from the blockchain from the report.

20 Claims, 11 Drawing Sheets

ULTRA-SECURE BLOCKCHAIN ENABLED ANALYTICS

CLAIM TO PRIORITY

This Non-Provisional application claims under 35 U.S.C. § 120, the benefit of the Provisional Application 62/200,670, filed Aug. 4, 2015, Titled "Ultra-Secure Blockchain-Based Electronic Information Transfer System", and as a Continuation-in-Part of Non-Provisional application Ser. No. 15/227,368, filed Aug. 3, 2016, Titled "Ultra-Secure Blockchain-Based Electronic Information Transfer System", which is hereby incorporated by reference in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Encryption technologies are well established in industries where data is private and must be secured against theft, intrusion, intentional corruption, or any other non-authorized access and/or use. As each generation of data encryption utilities has been created, effort has been expended by multiple groups and individuals to discover a way around the encryption capability so as to be able to access the private data. Public key encryption algorithms and one-time cipher systems can create very strong protection for data encrypted utilizing these methods. Additional methods have been created to attempt to address the creation of secure encryption methods that may be applied very quickly, so as to perform encryption in real-time, and to create ever more secure data storage for data being encrypted.

Blockchain systems are most commonly understood within the realm of financial transactions and the creation and use of digital currencies such as bitcoins. A blockchain has the advantage of providing a complete log of all transactions that are associated with the blockchain as an inherent feature of the blockchain. Additionally, a blockchain may permit a user to "walk" the blockchain to discover the provenance of any and all data stored within the blockchain. This feature is a very powerful means for knowing the origin and association of each portion of data stored within the blockchain, but comes at a cost of requiring more and more time to encode the data within a blockchain as transactions associated with the blockchain become more numerous.

Encrypted data may be stored within a blockchain, although the amount of time required to construct and/or access any portion of the blockchain can be prohibitively long.

Data Security of data within a blockchain, particularly when the blockchain contains encrypted data, is assured. However, information, such as meta-data, about the data secured within the blockchain is also difficult to discover, even though such data may not be encrypted.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to "blockchain" refers to a distributed database that maintains a continuously-growing list of data records secured from tampering and revision. It consists of data structure blocks which hold both data and programs. Each block within the blockchain holds batches of individual transactions and the results of any blockchain executables. Each block contains a timestamp and a link to a previous block.

The system and process herein presented is related to an ultra-secure, blockchain-based electronic file system encryption, storage, retrieval, and decryption system. In an embodiment, the system may consist of an electronic data transfer platform that incorporates the steps for the acceptance and secure encryption of data, files, multimedia, voice transmissions, or any other electronic media, storing the encrypted data for later retrieval, and decryption of data upon retrieval from storage. The system permits the secure upload, encryption, and transfer of sensitive and/or valuable electronic information using a novel blockchain capability to confirm secure delivery to a third party.

In an embodiment, the system facilitates:
Secure data upload to a secure server
Slicing of information into separate packets
Encryption of separate packets
Secure data uploads to blockchain
Analyzing metadata associated with stored data packets without decrypting the stored data packets
Providing analytics results to one or more users
Enabling the torrent of blockchains
Retrieval of slices and decryption of separated blockchains
Identification of appropriate blockchains for reassembly into data packets
Delivery of data packets to a requesting user In an exemplary embodiment, electronic information in the form of files containing any form of information including, but not limited to, text, audio, video, multimedia, financial data, streaming data, digitized data, publications, software programs, or any other information transmitted electronically may be selected for secure encryption. In this exemplary embodiment, information files may be streamed to a user's computer system through a torrented stream of data that has been encrypted and placed in a blockchain, receiving slices of the information files as needed to ensure that the originally transmitted information file(s) are never fully intact during transmission. In this embodiment, each blockchain component may be compressed through 3D-based voxel logic and each block may be individually encrypted allowing for partial or fully homomorphic editing of the dataset. In this implementation, the public ledger maintained by the system may compile groups of files as the files are torrented through multiple servers. This public ledger may provide a proof of transaction and timestamp for the file and commercial activity.

In an embodiment, a blockchain capable secure encryption system process may begin with the acceptance of one or more information files from a user. Each information file may be hashed to create a unique identifier (ID) that not only identifies the information file, but also is used as part of the segment ID that is created for each segment of the information file. The information file may then be compressed to reduce the overall size of the file to be encrypted, however, the compression is not a requirement prior to encryption. If the user requires greater time sensitivity, compression of the information file may be omitted.

In this exemplary embodiment, the information file, whether compressed or uncompressed, may be encrypted utilizing any encryption cipher or methodology preferred by the user. The system may utilize any encryption cipher or method such as public/private key, Pretty Good Protection (PGP), RSA, or any other encryption method in use by the information file owner. Choosing the encryption methodology permits the owner to share the encrypted file with any other authorized user. In this exemplary embodiment, the file hash of the encrypted file, previously created, is gathered and utilized as the file name of the grid table portion of an echo key table to be created for each information file. The grid table portion may then be created with the file name hash from the originally submitted information file. As a portion of this step, the system also gathers the original information file name and file size.

In this exemplary embodiment, after the creation of the grid table portion, the information file is sliced into segments of about the same size. In a non-limiting example, file segments may be sized from about 200 Kilobytes to about 4 MegaBytes. The file size selected for each segment is dependent upon the latency requirements of the user; if the latency requirements are strict a smaller file segment size may be selected, or if the latency requirements are more relaxed a larger file segment size may be selected. In this embodiment the file segments are hashed individually to create a hash ID for each segment. The segments are catalogued in the grid table portion with each segment having a segment number, segment hash ID, and information file name. In this fashion each segment is identified with a particular information file. The grid table portion records the segment as coordinates of a table via both the information file hash and the segment hash as coordinates of the segment. Upon completion of the grid table portion, the segments and grid table portion are scheduled to the designated blockchain for the user information file. At this point in the process, all information files are encrypted, incorporated within one or more blockchain structures, and stored in a distributed database.

In an embodiment, reconstruction of one or more information files begins through the submission of a grid hash table associated with an information file and the information file name to a system server. The system server transmits the encrypted grid table to a user. The user decrypts the grid table using the pre-arranged encryption cipher or method, and submits the decrypted segment names and hash values to the system server to permit the system server to retrieve the segments from the electronic databases into which the segments have been distributed. The segments are then reassembled following the order and relationships recorded in the grid table. The segment reassembly produces the original encrypted information file.

The system server utilizes the user signature to decrypt the original encrypted information file. If the encrypted information file was compressed, the system server will perform a decompression action on the information file. If the encrypted information file was not compressed, the system server may skip this step in the process. The information file is tagged with the original information file name retrieved from the grid table. The reconstituted and decrypted information file may then be verified using the check hash originally generated from the information file prior to entering this process.

Key Management:

In an exemplary embodiment, encryption keys may be maintained either remotely or in a data file that is local to the user. Encryption keys may be handled within a grid table and stored in an electronic database stored on the client machine or on a system server. The encryption keys will not ever be placed in the master blockchain. By storing encryption keys remotely, a user account may be recoverable from a blockchain utilizing an echo key construct that is created during the encryption and storage portion of the process.

Echo Keys:

In an exemplary embodiment, echo keys permit a user or client to use an integral account recovery method, secure multiple machines under one account, and share information files between multiple users. In this exemplary embodiment, echo keys serve the role of a settling mechanism and are placed within each blockchain that is associated with an information file. Once created, the echo keys are stored within the grid table as the location mechanism for each slice of the information file. The grid table, and the echo keys stored within the grid table, is named after the hash of the information file. The grid table may then be hashed and encrypted and placed within each blockchain associated with the information file. Utilizing this mechanism, a user or another associate with the user may look up the echo keys by retrieving and decrypting the grid table as all copies of the blockchain associated with the information file will have the echo keys embedded within the blockchain as part of the grid table. In this exemplary embodiment, echo keys permit a client to use account recovery and secure multiple machines under one account. This permits the sharing of encrypted files among multiple users. Also, each machine that a client or user attaches to an account increases the complexity of the echo key set.

In an exemplary embodiment, to utilize echo keys a user or client may log into the secure service through a username and password check. Once logged into the secure service, the user may be directed to an echo key chain established for the user. The echo key chain may contain the user's account information. This information may include contacts and/or information files that are associated with the user. This information is supplied via the echo key table and it is encrypted with the user's encryption key, the system's encryption key, and the hardware signature of the system to which the information is being sent. The echo key chain is then destroyed after updating to the master login.

In this exemplary embodiment, if the user logs into a system into which they are not registered as an account holder, the user must provide access to the account from a known system. The echo key table portion of the grid table allows for account recovery if there is an admin echo key initialized at the genesis of the echo key table. In this instance, the genesis of the admin echo key may provide admin rights to permissions sets for information files. However, read access to information files may still be withheld from an admin. This creation of echo keys and an echo key table, both for users and admins, may permit the creation of a full-featured blockchain data base. Additionally, the creation of an echo key and echo key table mechanism allows the blockchain to perform maintenance on information files contained within the blockchain(s) in which the information files have been stored. Maintenance may include the management of creation and deletion of information files from the master blockchain at the initiation of a "cleanup" command.

In an exemplary embodiment, the document presents a system and method for secure data file encryption, where the secure encryption consists of receiving one or more data files from sources exterior to a first processor and slicing the received data files into smaller data segments. After creating the data segments, encrypting each data segment individually and uploading each individually encrypted data segment into a blockchain structure. The system and method transmitting the blockchain structure to a plurality of second processors, each second processor of which is physically separate from said first processor. The system and method then identifies and locates the blockchain structure to retrieve all segments and reassembles the blockchain structure within the first processor. After reassembly, decrypting the blockchain structure and reconstructing the one or more data files for delivery to a user.

In an exemplary embodiment, the slicing of the received data files results in segments from about 200 kilobytes to about 4 megabytes in size, and the encryption of each data segment may be performed using public/private key, PGP, RSA, or any other encryption technology in use. In this embodiment, each individual encrypted data segment is placed on one or more blockchains, each blockchain of which is a portion of the blockchain structure, where each blockchain in the blockchain structure further comprises an echo key and grid table. Additionally, the blockchain structure is distributed among a plurality of second processors that may be located within a cloud system, or may be located anywhere external to the first processor.

In an exemplary embodiment, the system and method begins reconstruction of the input data files by retrieving an echo key and grid table from any blockchain within the blockchain structure. Utilizing the echo key and grid table, the system reassembles the segments recorded within the echo key and grid table into the original one or more data files. The system and method then decrypts the reassembled one or more data files utilizing the same encryption method used to encrypt the one or more data files, whereupon the one or more data files may be delivered to a user in either encrypted or decrypted format.

Analytics:

In an exemplary embodiment, an Artificial Intelligence (AI) engine may be used to associate data within the blockchain with a relationship key. The relationship key may then be used to associate data within the blockchain with meta-data about the data stored within the blockchain. In this fashion, analysis of the meta-data may be performed to drive some understanding and results about the data within the blockchain without actually decrypting and/or reading the data stored within the blockchain.

In an initial step, the AI engine must be trained to recognize keywords that may be found in incoming data files. The training process requires a human curator to build a training data set and lexicon and present the information to the AI engine to permit the AI engine to recognize and identify keywords that may be present in unknown incoming data files. In a non-limiting example, a training set may be created from an English language dictionary where the AI engine will intake a word and create a hash for that word. The AI engine may then read the context for the particular word and create an association with the word definition, also hashing each word in the definition, such that the AI engine understands that the created hash represents that word. Additionally, a difficultly multiplier may be associated with particular words or terms based upon various parameters such as length of term, difficulty in associating a particular context if there are several definitions associated with a word or term, whether a term is specific to a particular business or art, or any additional difficulty that may be assigned by the human curator.

This training data set and lexicon may be created prior to the receipt of any unknown data files to permit the AI engine to quickly process the incoming data file and provide a hash for each term in the incoming data file. It will be understood that multiple training sets may be created and provided to the AI engine to provide for faster training, more specific hash values, and quicker processing of unknown data files for particular clients.

In an embodiment, after the creation of a training data set and training the AI engine to recognize the words and/or terms in the training data set, the AI engine may be provided with unknown data files and/or data sets. The AI engine will process all incoming terms in accordance with the learned words and/or terms and assign a hash to each incoming word and/or term in the incoming data file. Once again, the hash will consist of a pure hash created from a one-way hashing algorithm in combination with a difficulty multiplier to update the hash value such that the assigned hash value=hash value+difficulty multiplier. The assigned hash value, Hash1, is then assigned to an echo table and placed on the blockchain, and then each value is encrypted. The encrypted Hash1 is then subjected to an additional hash operation utilizing a pre-selected one-way hashing algorithm to create a hash value, termed HashA, of the encrypted Hash1. The AI engine may then create a direct correlation between each Hash1 value with its corresponding HashA such that each Hash1 value is associated with its corresponding HashA value. In this manner, the AI engine may perform analysis of the meta-data surrounding the HashA values to create analytic information about the incoming encrypted data files without decrypting the data files.

In an embodiment, the analytic information may include information on the frequency of terms or words in a data file, information about authorship, information about copies or shared data, how often the data file has been accessed, and additional information about the creation and usage of the data files. The AI engine develops a numerical relationship between words and/or terms in an incoming data file. The numerical relationship is present as a string of values for each keyword, where the AI engine assigns a 1 for each keyword that is present in the data file each time the keyword is encountered, or assigns a 0 for each word or term that is not a keyword. The string represents one layer of metadata about the information within the incoming data file, and may then be used to assist in the analysis of terms in the data file. Once again, all analysis is performed on the HashA values created by the system and all analytics are derived without the need to decrypt the data files that have been placed on the blockchain and encrypted. The AI engine may then create reports surrounding particular analytic values in which a user may have an interest and transmit the analytic report to the user. The user may then utilize the report to retrieve the actual encrypted data as necessary.

In an embodiment, this process may create a secure memory lock, keeping the data files securely encrypted while still providing a user with information about the data files that may be used to inform decisions about whether and how to use the information in the data files. All memory values associated with the data files, including all Hash1, HashA, and analytic metadata may be read and utilized, but the information in the data files referenced by the memory values may not be read without retrieving from the blockchain. Additionally, the Hash1 and HashA values, as well as the metadata strings developed by the AI engine are maintained in Random Access Memory (RAM) for speed of access and to facilitate faster processing of analytic information and creation of analytic reports. If the server or other machine upon which the process is active loses power or power is removed from the server or other machine for any reason, all Hash1, HashA, and metadata values are irretrievably lost.

Figure 1:
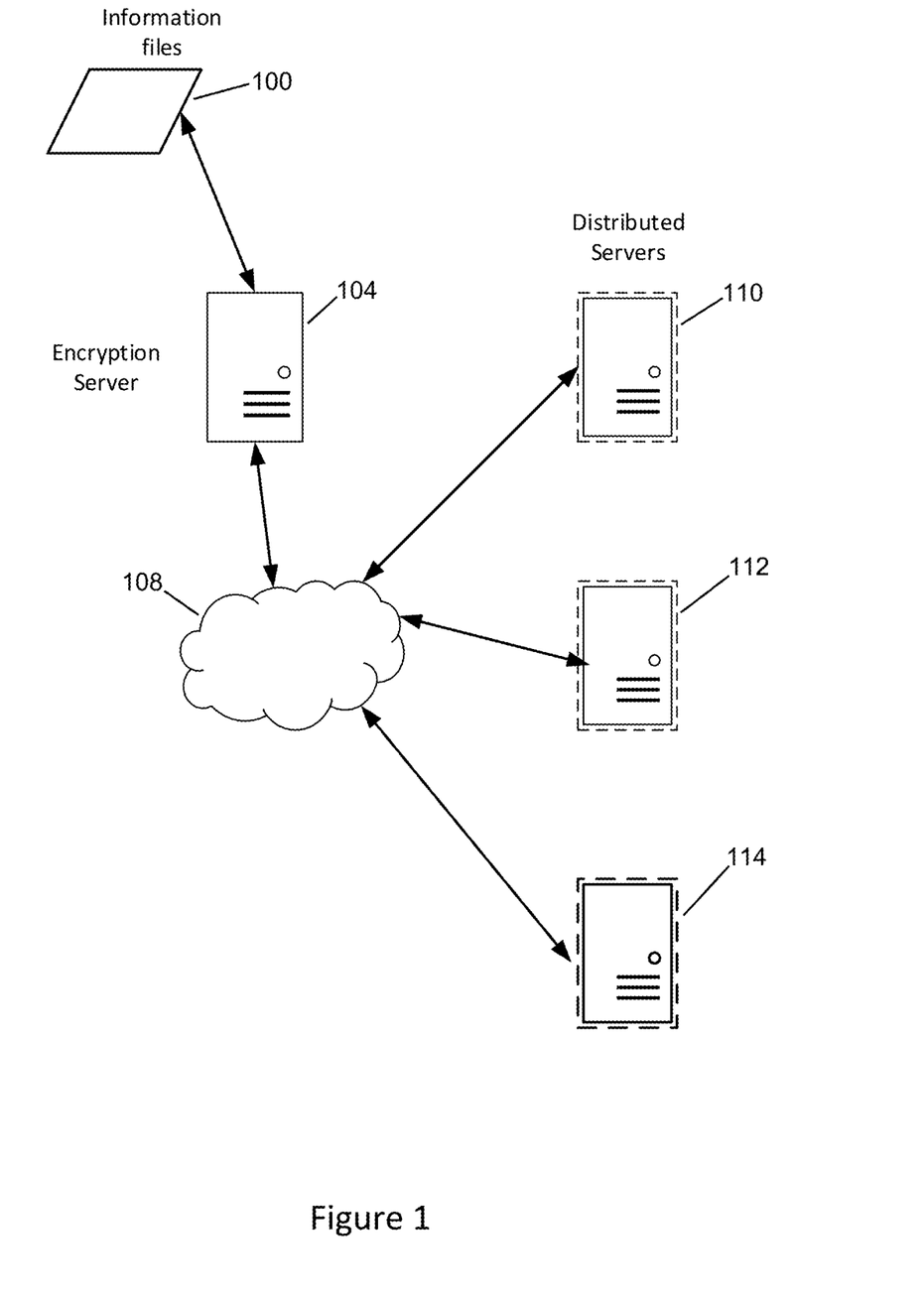
FIG. 1 is a view of an exemplary system implementation consistent with certain embodiments of the present invention.

Turning now to FIG. 1, this figure presents a view of an exemplary system implementation consistent with certain embodiments of the present invention. In an exemplary embodiment, information files 100 are transmitted from one or more user systems to an encryption server 104. The encryption server 104 is configured to segment and encrypt the information files 100 received from the one or more user systems. The encryption server 104 utilizes a blockchain enabled operational module to segment and encrypt the received information files 100 and transmits the encrypted information file segments to digital storage in the cloud 108. In an exemplary embodiment, the segmented, encrypted information files may be distributed within a plurality of cloud-based servers (110, 112, 114). In this manner, the system has encrypted and stored information file segments in a distributed fashion such that retrieving any one information file segment will not compromise the information file as a whole.

In this exemplary embodiment, information file segment locations are tracked by the encryption server. When requested by the user, information files may be retrieved from each of the storage servers (110, 112, 114), through the cloud storage management 108 and returned to the encryption server 104. The encryption server 104 provides both the decryption and reassembly of the retrieved information file segments back into the information files 100 that were originally transmitted to the encryption server 104.

Figure 2:
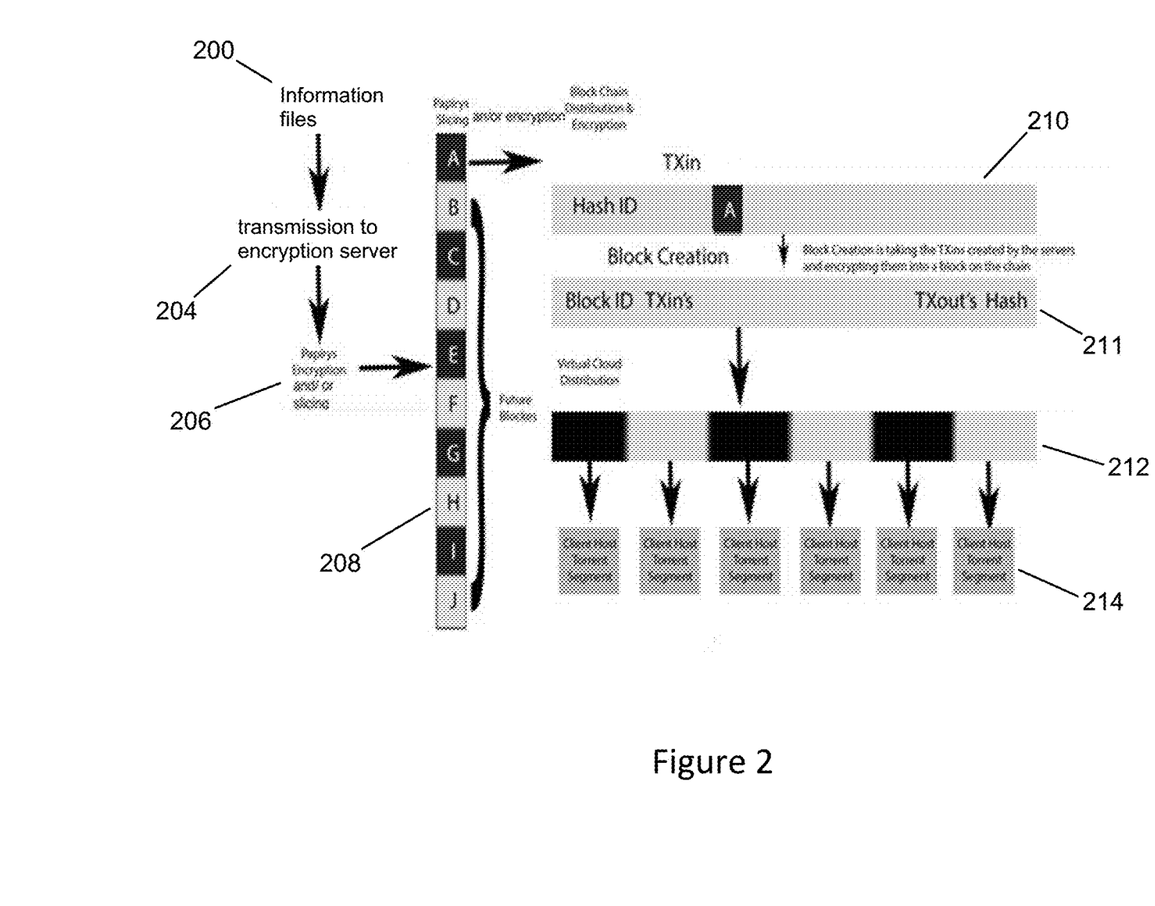
FIG. 2 is a view of a file streaming function consistent with certain embodiments of the present invention.

Turning now to FIG. 2, this figure presents a view of a file streaming function consistent with certain embodiments of the present invention. In an exemplary embodiment, the system presents the transmission of one or more information files 200 from a user. The information files 200 may be transmitted to the encryption server 204 to begin the process of secure encryption. The encryption server receives the information files at 206 and creates a hash for each received file, storing the created hash as the unique ID for each received file. In this exemplary embodiment, the file hash of the encrypted file, previously created, is gathered and utilized as the file name of the grid table portion of an echo key table to be created for each information file. The grid table portion may then be created with the file name hash from the originally submitted information file. As a portion of this step, the system also gathers the original information file name and file size.

In this exemplary embodiment, after the creation of the grid table portion, the information file is sliced into segments of about the same size at 208. In a non-limiting example, file segments may be sized from about 200 Kilobytes to about 4 MegaBytes. The file size selected for each segment is dependent upon the latency requirements of the user; if the latency requirements are strict a smaller file segment size may be selected, or if the latency requirements are more relaxed a larger file segment size may be selected. In this embodiment the file segments are hashed individually to create a hash ID for each segment. The segments are catalogued in the grid table portion with each segment having a segment number, segment hash ID, and information file name at 210. In this fashion each segment is identified with a particular information file. The grid table portion records the segment as coordinates of a table via both the information file hash and the segment hash as coordinates of the segment.

In this exemplary embodiment, the file segments are encrypted into separate blocks within a blockchain construct at 211. The blockchain created from each group of segments that are sliced from each information file is referenced utilizing a unique set of IDs from the original file name, the segment hash, and the segment number and storing this information into a grid table associated with that particular information file. This information is also encrypted and stored within a block on the blockchain, providing identification and information security for the segments and information file as a whole.

In this exemplary embodiment, at 212 each hashed and encrypted segment may be transmitted to digital storage within a cloud storage system. The cloud system may then transmit the hashed and encrypted segments at 214 in a torrent to a plurality of servers, where individual segments may be placed on different servers to permit complete dissociation between segments, such that if a segment is retrieved from a single server, the remainder of the segments required to decrypt and reconstitute the information file are not located on the same server.

In this exemplary embodiment, at the termination of this encryption and distribution process, the information files from the user are separated into a plurality of segments, each of which is encrypted into the blockchain, and the entirety of the information file may only be retrieved through the retrieval of all of the segments and the grid table associated with the information file as it is stored on a blockchain.

Figure 3:
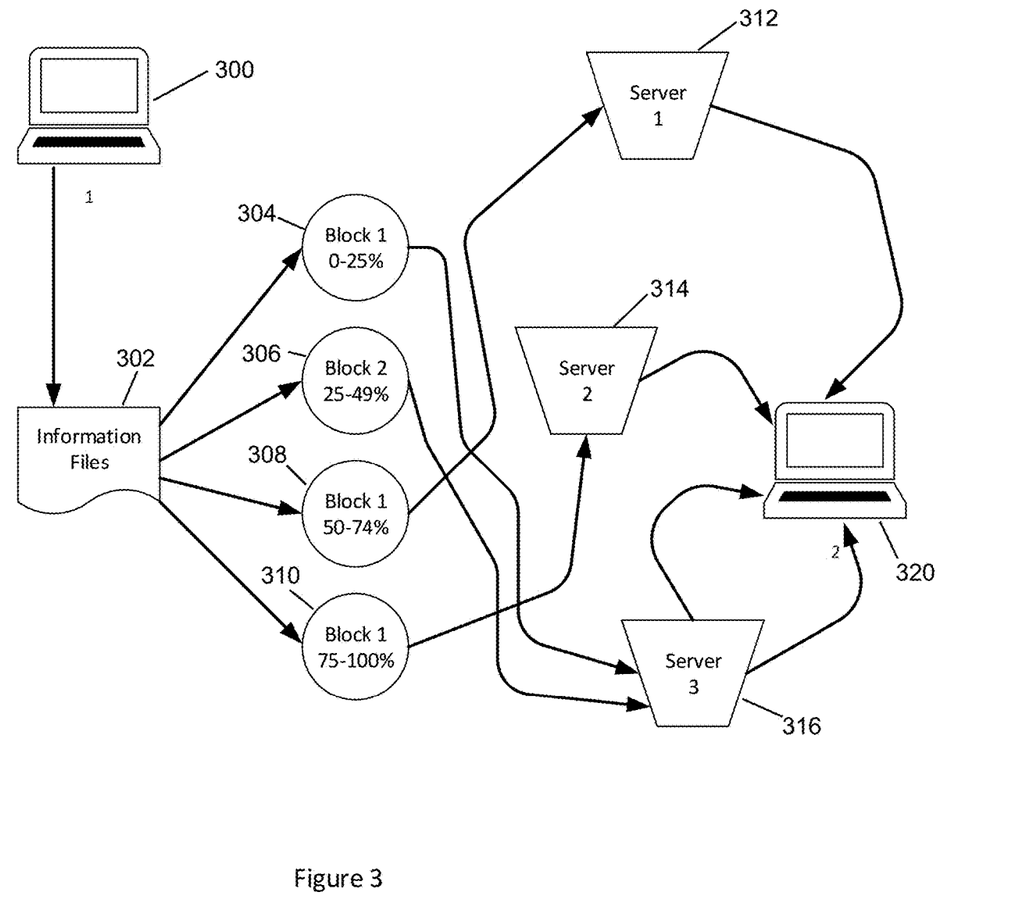
FIG. 3 is a view of a file slicing and encryption function consistent with certain embodiments of the present invention.

Turning now to FIG. 3, this figure presents a view of a file slicing and encryption function consistent with certain embodiments of the present invention. In an exemplary embodiment, a first user 300 may transmit an information file 302 to be encrypted. In this exemplary embodiment, the information file 302 may be sliced into segments, with each segment being encrypted and placed within one or more blockchains. In this exemplary embodiment, the information file 302 may be segmented such that the information file segments are placed within four separate blocks to form a blockchain, weighted such that the segments in the first 25% of the information file 302 are placed in a first block 304, the segments in the second 25% of the information file 302 are placed in a second block 306 in the blockchain, the third 25% of the information file 302 are placed in a third block 308, and the final 25% of the information file 302 are placed in a fourth block 310 to complete the blockchain for the information file 302.

Upon the completion of the formation of the blockchain, the blockchain may be distributed among a plurality of servers (312, 314, 316). In this manner, the encrypted segments stored within the blockchain are securely distributed such that retrieving and reconstituting the information file is extremely difficult. In this fashion, the blockchain is securely held within the distributed servers until a request to reconstitute the information file 302 is made.

In this exemplary embodiment, when a second user 320 wants to recover the information file for use, the encryption server (not shown) may retrieve the grid table from the blockchain and utilize the identifiers in the grid table to retrieve each of the information file segments contained in the blockchain from the servers upon which they have been stored. The blockchain is reconstituted and the segments recombined to form the entire encrypted information file. The information file may then be decrypted and transmitted to the second user 320.

Figure 4:
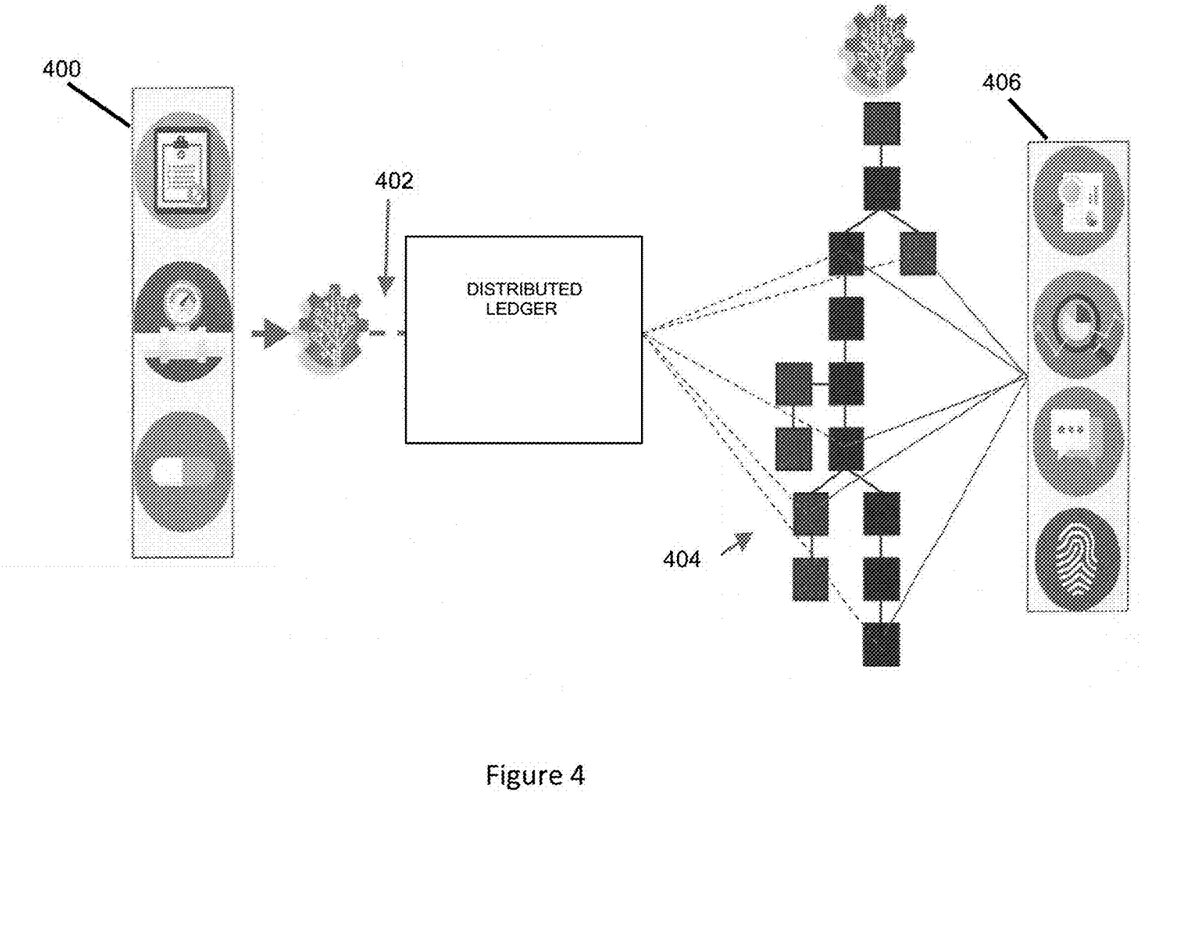
FIG. 4 is a view of an analytic function for smart contract security consistent with certain embodiments of the present invention.

Turning now to FIG. 4, this figure presents a view of an analytic function for smart contract security consistent with certain embodiments of the present invention. In an exemplary embodiment, the creation and transmission of smart contract files may be facilitated by the use of real-time, blockchain enabled encryption and decryption. In this non-limiting embodiment at 400, industries such as healthcare, energy, and pharmaceuticals may safely store information files such as contracts and other sensitive data files in a blockchain enabled encryption and storage capability. In this blockchain enabled encryption system, such sensitive files may be analyzed and modified without needing to first decrypt the sensitive data files.

In this exemplary embodiment, at 402 data files and other information files may be encrypted, segmented and then placed upon one or more blockchains. The tracking and management of the information and data file segments is accomplished through the use of an echo key portion of a grid table. The echo key table portion is used to place information and data file segments inside the blockchains in such a way that the tracking and reconstruction may be performed without having to first decrypt each information and data file segment.

In this exemplary embodiment, at 404 greater obfuscation, and security, of the information and data files may be achieved through placing all of the segments into more than one blockchain. This obfuscation means that hackers and others who intercept the transmitted data files, or steal the data file segments from digital storage, cannot reconstitute the segments into the original information and data files without access to all of the segments. Additionally, each information and data file segment are individually encrypted such that if an attempt were to be made to decrypt the encrypted data file segment using a brute force decryption attack, side-channel attack, or man-in-the-middle attack, each information and data file segment would take just as long to decrypt as every other segment. This methodology makes the effort to decrypt an entire information or data file impossibly long in terms of time. The information and data file segments are placed on the multiple blockchains utilizing voxel logic that creates the metadata for reconstruction of the information or data files based upon the relative blockchain and the relative position within the blockchain of each segment.

In this exemplary embodiment, at 408 analytics tools associated with the echo key table permit the encryption server to locate, modify and analyze information and data files while they remain distributed. This action may be performed in real-time, as the latency for retrieval and analysis of the distributed segments is low enough to permit such real-time analysis.

Figure 5:
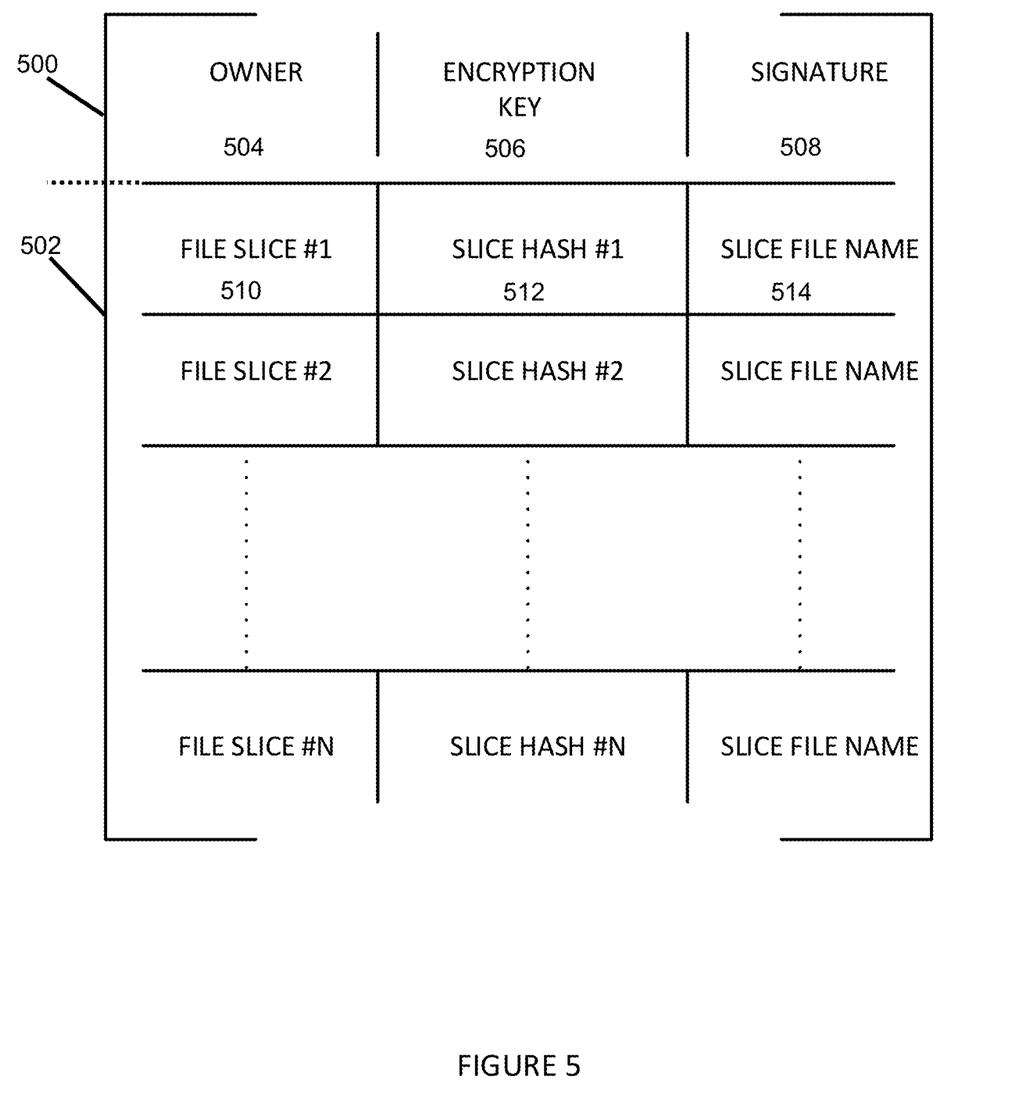
FIG. 5 is a view of an echo key table consistent with certain embodiments of the present invention.

Turning now to FIG. 5, this figure presents a view of a grid and echo key table consistent with certain embodiments of the present invention. In this embodiment, the grid and echo key table are created during the slicing and storage portion of the secure encryption capability. The table may consist of an echo key table portion 500 and a grid table portion 502. In this embodiment, the echo key table portion records the information file owner identifier 504 in the first row and first cell of the table. Regardless of the method of encryption utilized, the encryption key 506 is stored within the first row and second cell of the echo key portion of the table. The file signature 508 is stored within the first row and third cell of the echo key portion of the table.

Although not shown in this exemplary figure, the echo key portion of the table may also contain information for the machine upon which the information file has originated, and information for any share users who are permitted to receive, modify, or otherwise interact with the information or data file. The permission is provided by the owner of the file, and the additional users are specifically identified during the creation of the echo key table associated with the echo key table. Each blockchain into which portions of the information and data files are encrypted keeps and maintains a copy of the echo key and grid table. This distributed storage permits the recovery of the information or data file when one portion has been corrupted or destroyed by recovering the echo key and grid table from another blockchain into which portions of the information or data file have been encrypted.

The grid table portion 502 is built by the encryption server during the creation of the one or more blockchains into which the information or data file is encrypted. Each segment of the information or data file that is created during the slicing operation may be between approximately 216 kilobytes to approximately 4 megabytes in length. The slicing operation creates segments, or slices, of the input files, each slice of which is hashed by the encryption server. The slices are catalogued in the grid table in series by propagation utilizing three parameters. The first parameter is the slice number 510. The slice numbers are preferentially stored within the grid table in order of creation. The second parameter is the hash of the associated slice 512, and the third parameter is the file name 514 of the original information or data file check hash. The grid table records the slice coordinates within the grid table using both the check hash of the original information or data table, and the slice hash created from the hash operation on each slice. In this embodiment, it should be noted that the grid table may contain an indeterminate number of slices, or segments, numbered from 1 to N, based upon how large the original information or data file was and the size of each individual slice to be created as specified above.

Figure 6:
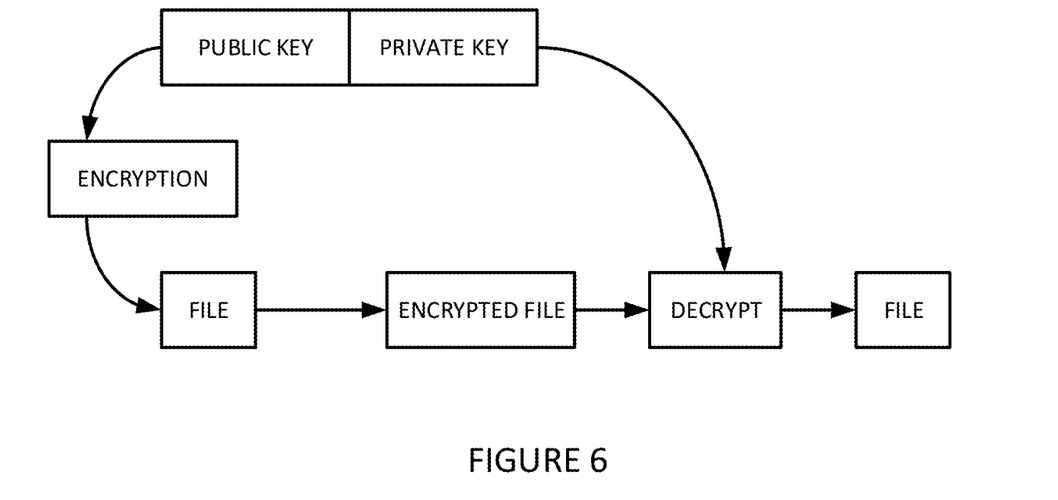
FIG. 6 is a view of single user/machine implementation consistent with certain embodiments of the present invention.

Turning now to FIG. 6, this figure presents a view of single user/machine implementation consistent with certain embodiments of the present invention. In this embodiment, a public/private key encryption is performed to encrypt a file. In this process the public key is utilized to encrypt an information file. The encrypted file may then be transmitted to a destination receiver where the decryption may be performed utilizing a private key transmitted to the decrypting system through a communication pathway different from that used to transmit the information or data file. This process is a common method for creating and transmitting encrypted files using a public/private key encryption process.

Figure 7:
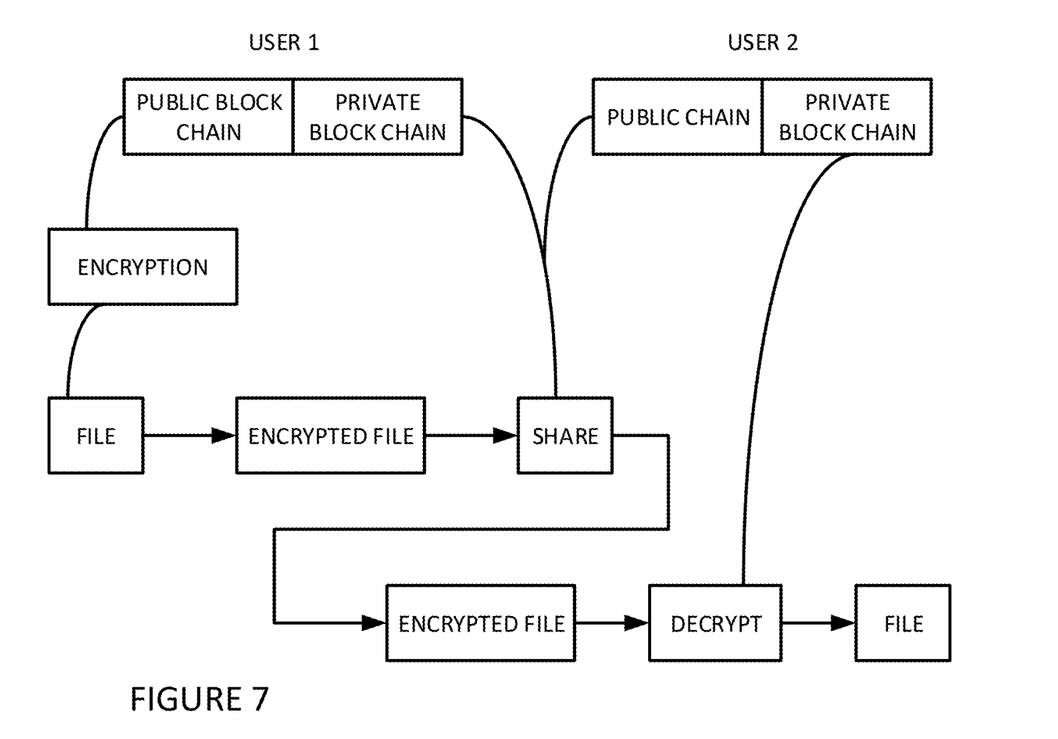
FIG. 7 is a view of a blockchain share example consistent with certain embodiments of the present invention.

Turning now to FIG. 7, this figure presents a view of a blockchain share example consistent with certain embodiments of the present invention. In this embodiment, a public/private key encryption may be utilized as a portion of creating an echo key and grid table encrypted share for encrypted information files. In this exemplary embodiment, the information file may be encrypted using the public key from a first user. The encrypted file may then be further encrypted with the signature from user 1, which is created through the use of the combination of the public and private keys from user 1, and the public key from a second user. The encrypted file name and identifiers are now placed in the grid table and the file encrypted in a traditional manner using the encryption from the first user's public key, the signature from user 1, and the public key from user 2. This file is transmitted to a destination where the signature from user 1 and the private key from user 2 are required to decrypt the information file.

Figure 8:
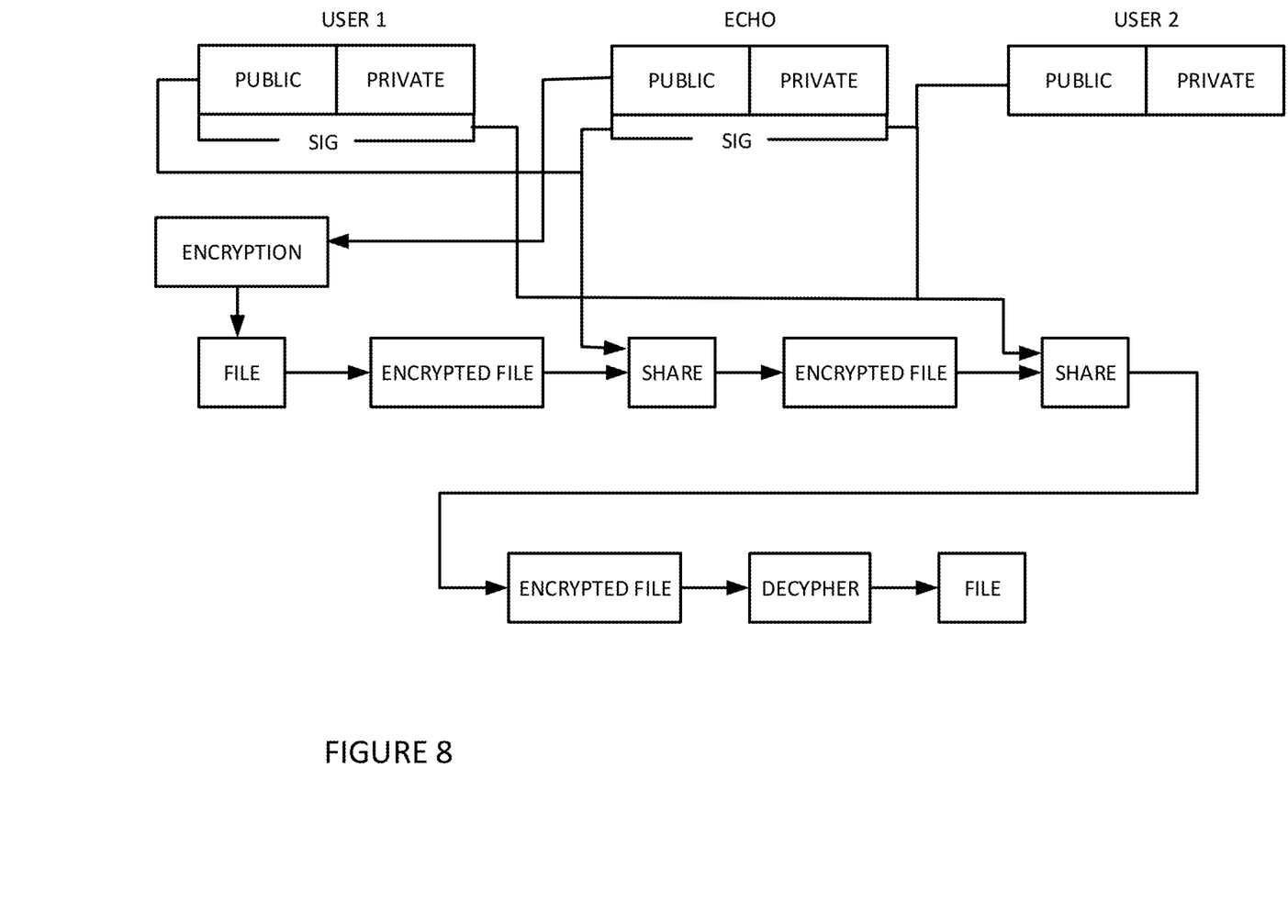
FIG. 8 is a view of an echo blockchain share example consistent with certain embodiments of the present invention.

Turning now to FIG. 8, this figure presents a view of an echo blockchain share example consistent with certain embodiments of the present invention. In this embodiment, which is a more robust embodiment than previously known encryption capabilities, the encryption server first encrypts the incoming information file with the encryption method preferred. In this non-limiting example, the encryption method is public/private key encryption, although other encryption ciphers or methodologies may be used without deviating from the recited innovation. As previously described, the encrypted file is sliced into segments and then a hash formed for each segment. The segments may then be further encrypted with the signature of the first user, and the encryption server and user 1 names recorded into the echo key table prior to placing each segment within one or more blockchains.

In this robust embodiment, if additional users are designated as sharing the information file, the segments may be encrypted with the signature of the encryption server, the signature of the first user, and with the private key of an additional user. These additional identifiers are then stored within the echo key table. When an information file is retrieved for decryption and reassembly, or to perform operations on one or more segments without decrypting the entire information file such as sharing the encrypted file, the encrypted segments may be located through the echo key table, retrieved, and then decrypted for use. The complete decryption of the information file may be accomplished by using the signature of the encryption server, the signature of user 1, and the private key from user 2.

Figure 9:
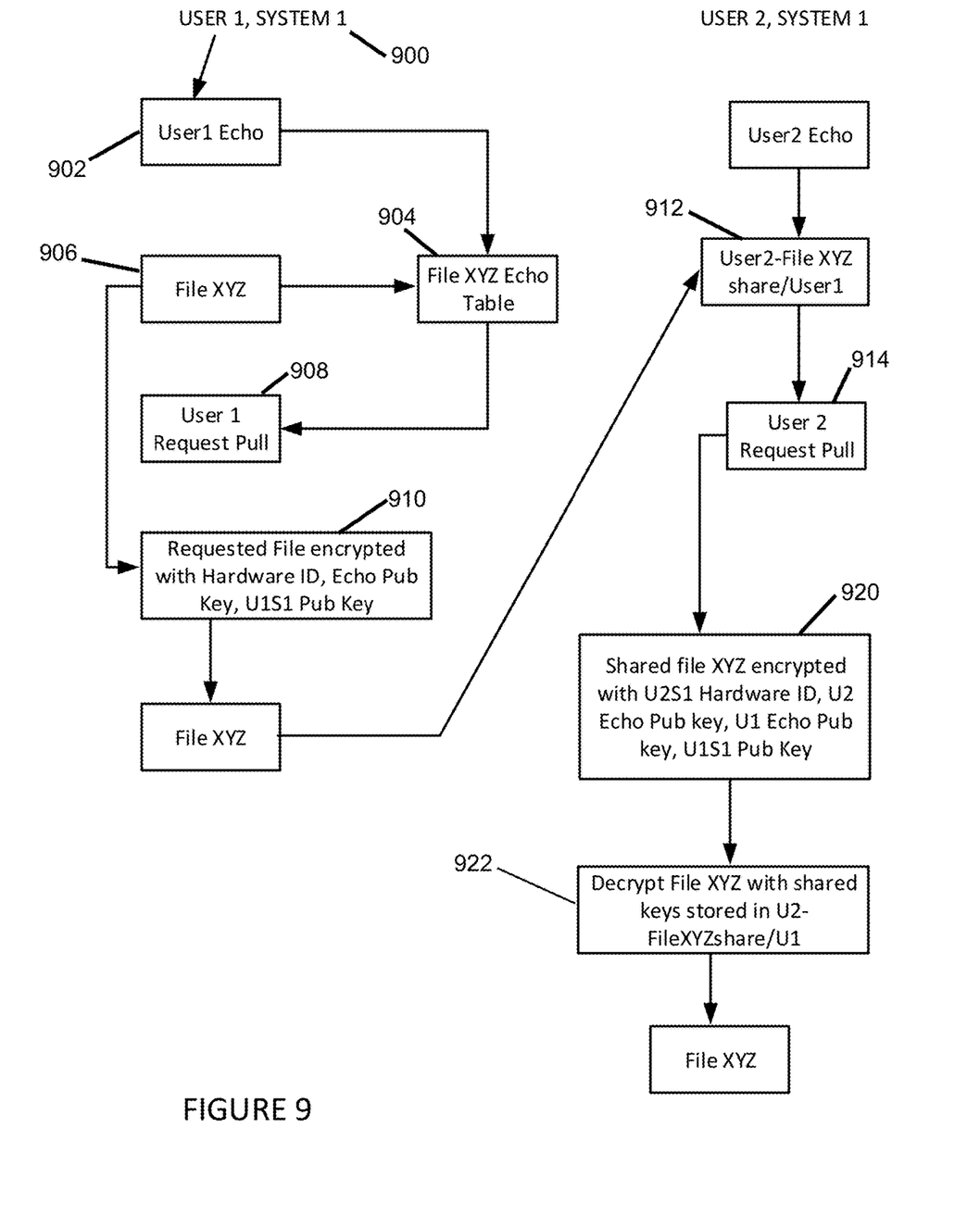
FIG. 9 is a view of a shared user encryption function consistent with certain embodiments of the present invention.

Turning now to FIG. 9, this figure presents a view of a shared user encryption function consistent with certain embodiments of the present invention. In this embodiment, the methodology for encryption recited here permits the blockchain to perform maintenance on the blockchain, as well as other operations. In this exemplary embodiment, at 900 user 1, located on system 1, serves as an encryption server for the creation of a blockchain encryption of one or more information files. Upon creation of the blockchains for the information file, the encryption server creates an echo key and grid table for the blockchains 902. At 904, the information file is encrypted with the encryption server public key, although this is only one encryption method that may be employed.

At 906, the information file encrypted through the use of the encryption server public key may be stored on a series of distributed servers. At 908, user 1 may request a download of the information files for which blockchains have been created. The encryption server associated with user 1 may transmit the echo key table to the system requesting the information file pull at 910. The information file transmitted to the requestor is then encrypted with the hardware ID, typically a MAC address of the system 1 associated with user 1, the encrypting server public key (as stored in the echo key table) and the user 1, system 1 public key. This information file may then be stored to another system or shared with additional users.

In the embodiment where the encrypted information file is shared with a user 2, at 912, user 2 is added to the echo key table associated with the information file and stored in the blockchain. The echo table is also used to further encrypt the segments associated with the information file such that each segment is now encrypted with the encryption IDs associated with user 2. In this embodiment, at 914 when user 2 requests a pull of the information files, the shared file that is delivered has been encrypted with the User 2, System 1 hardware ID, the User 2 public key from the echo key table, the User 1 public key from the echo key table, and the User 1, System 1 public key. Each of these keys and identifiers are stored in an echo key table that has been created with the User 1, User 2, and information file Identifiers. At 920, the original information file may be decrypted utilizing the echo key table in which the User 2, System 1 hardware ID, the User 2 public key from the echo key table, the User 1 public key from the echo key table, and the User 1, System 1 public key have been stored.

In a non-limiting embodiment, User 1 may also delete User 2 from sharing or accessing the file segments created and stored for the original information file by simply deleting the echo key table containing the shared user information.

At 922, the original file, represented as File XYZ, may be decrypted with the shared keys stored in the U2-FileXYZ-share/User1 file.

Figure 10:
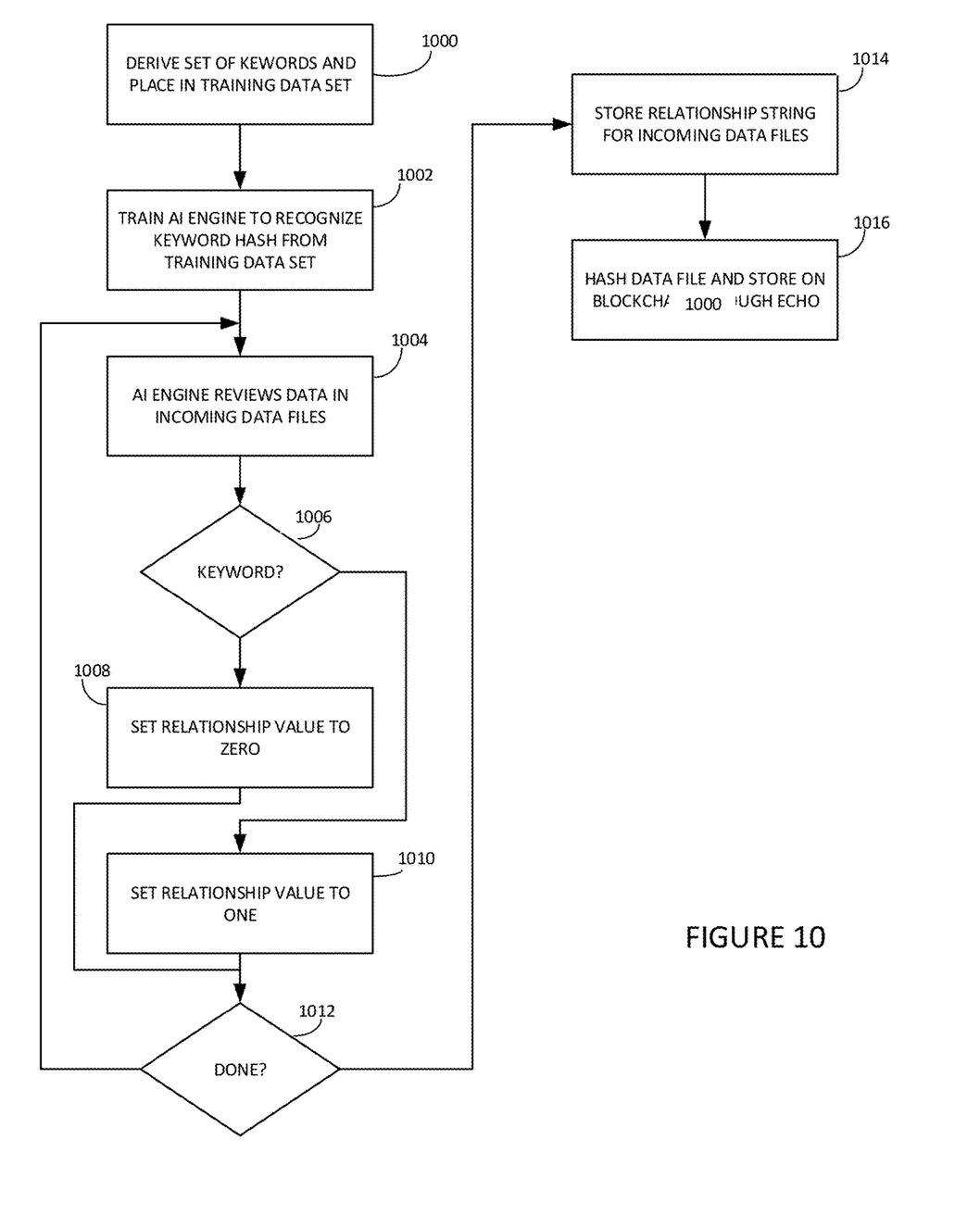
FIG. 10 is a view of creation of meta-data utilizing an AI engine consistent with certain embodiments of the present invention.

Turning now to FIG. 10, this figure presents a view of creation of meta-data utilizing an AI engine consistent with certain embodiments of the present invention. In an embodiment, at 1000 a training file may be created containing sets of keywords that are of interest to a user. Multiple training files may be created, with each training file directed to a particular set of keywords. The training file may contain a weighted hash of each keyword, permitting the training set at 1002 to train an AI engine on identifying a hash associated with the keyword and permitting the keyword hash to provide some contextual weighting. Each keyword hash thus comprises a hash created through processing the keyword through a one-way hash algorithm and providing a weighting value that may modify the hash value by combining the weighting value with the keyword prior to processing through the one-way hash algorithm. Any hash algorithm may be considered for use in this process step. At 1004, after creation of the training keyword hash set, an incoming data file is presented to the AI engine for review and processing. At 1006, the AI engine reviews each term and word in an incoming file to determine if that term or word is a keyword within the definition of the keywords established for the incoming data file. The definition of the keyword set for use by the AI engine may be defined as broadly or narrowly as a user desires, and then the keyword set definition is transmitted to the AI engine. At 1008, if the term or word is not a keyword within the set definition, the AI engine may place the value of zero in a string of relationship values that is created for each data file, concatenating the value with the existing string of values. At 1010, if the term or word is a keyword within the set definition, the AI engine may place a value of one in the string of relationship values, concatenating the value with the existing string of values. At 1012, the AI engine checks for the end of the data file, if the end has not been reached, the processing returns to step 1006 to classify the next term or word in the data file.

If the end of the data file has been reached, the AI engine at 1014 stores the relationship string for the incoming data file. At 1016, the AI engine may at that point create a Hash1 data file composed of the hash strings for each keyword in the data file and store the Hash1 data file on a blockchain through the echo process.

Figure 11:
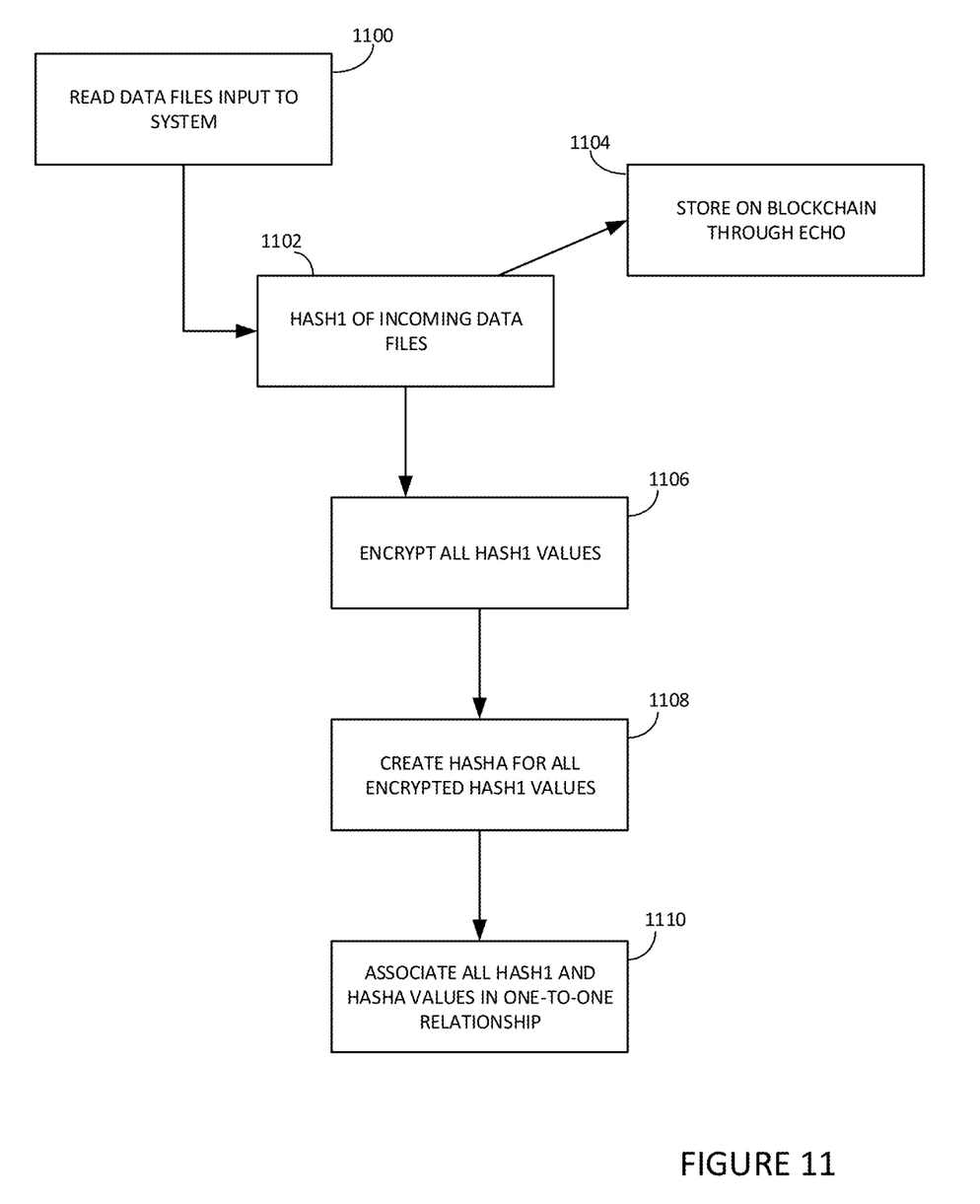
FIG. 11 is a view of association of meta-data utilizing an AI engine consistent with certain embodiments of the present invention.

Turning now to FIG. 11, this figure presents a view of association of meta-data utilizing an AI engine consistent with certain embodiments of the present invention. In an embodiment, at 1100 one or more data files may be read into the system for processing by the AI engine. The AI engine processes each incoming data file to identify all keyword terms and create a relationship string for each incoming data file. At 1102, the identified keywords, as indicated by the relationship string, are each processed through a one-way hash algorithm to create a Hash1 for each keyword in each data file. At 1104, each data file as represented by the Hash1 values for each keyword in the data file is transmitted to the Echo process for commitment to a blockchain. At 1106, each Hash1 value previously created is encrypted by the system. At 1108, the encrypted Hash1 values are processed through a one-way hash algorithm to create a HashA for the encrypted Hash1 values. At 1110, the system may also create a direct one-to-one relationship between each Hash1 value and its corresponding HashA value. Utilizing this one-to-one relationship, all analysis of metadata for each HashA value provides information and insight to the Hash1 values without permitting access to the underlying data values in the input data files.

Figure 12:
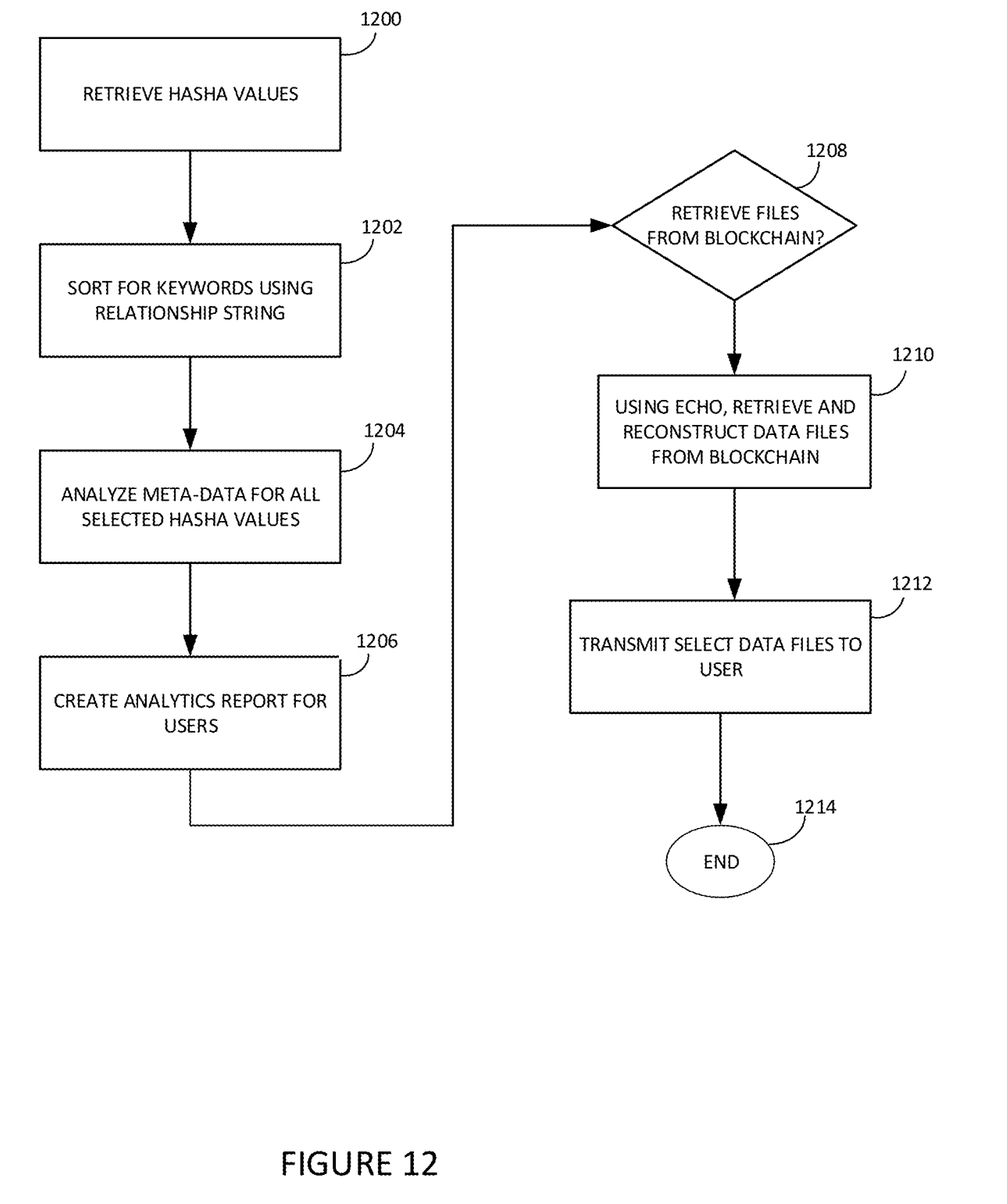
FIG. 12 is a view of the process of accessing meta-data associated with data within the blockchain and analyzing the meta-data for results consistent with certain embodiments of the present invention.

Turning now to FIG. 12, this figure presents a view of the process of accessing meta-data associated with data within the blockchain and analyzing the meta-data for results consistent with certain embodiments of the present invention. In an embodiment, at 1200, the system may retrieve all stored HashA values for one or more data files. At 1202, the system may use the relationship string associated with the stored HashA values to filter the keywords for the data file. At 1204, all meta-data associated with the stored HashA values may be analyzed for insights and operational data regarding the keywords represented by the HashA values. At 1206, one or more analytics reports regarding the metadata associated with the HashA values may be prepared for a user. Due to the one-to-one relationship between the HashA values and the Hash1 values, the insights and analytics derived in this manner may be directly ascribed to the Hash1 values and, by extension, be ascribed to the input data files from which both the Hash1 and HashA values are derived.

Based upon the analytics reports, at 1208 a user may determine that selected files should be retrieved from the blockchain. If the user desires to retrieve one or more selected data files from the blockchain, at 1210 using the Echo process, the system may retrieve and reconstruct the selected data files from the blockchain. At 1212, the retrieved, decrypted, and reconstructed data files may be transmitted to the user.

While certain illustrative embodiments have been described, it is evident that many alternatives, modifications, permutations and variations will become apparent to those skilled in the art in light of the foregoing description.

We claim:

1. A system for secure data file analysis and access, comprising:
 a first processor operative to receive one or more data files from sources exterior to the processor;
 a module operative to create a hash1 value for each element of each data file;
 a module operative to upload each hash1 value into a blockchain structure;
 a module operative to encrypt each hash1 value individually to create an encrypted data segment;
 a module operative to create a hashA value for each encrypted data segment and establish an association between said hash1 and said hashA values;
 a module operative to identify and locate metadata associated with each hashA value, and
 a module operative to analyze said metadata for particular values to discover analytic information of interest to a user and to create a report of said analytic information for delivery to said user.

2. The system of claim 1, further comprising creating a string of association values to associate keywords in said hash1 with keywords in said hashA.

3. The system of claim 1, where the encryption of each data segment may be performed using public/private key, PGP, RSA, or any other encryption technology in use.

4. The system of claim 1, where each individual encrypted data segment is placed on one or more blockchains, each blockchain of which is a portion of the blockchain structure.

5. The system of claim 4, where each blockchain in the blockchain structure further comprises an echo key and grid table.

6. The system of claim 1, where the metadata associated with said hashA values provides a direct relationship with metadata associated with hash1 values.

7. The system of claim 6, where said analytic information of interest discovered when analyzing metadata associated with hashA values is directly related to hash1 values.

8. The system of claim 7, where said analytic information of interest may be applied to data files associated with hash1 values without decrypting said data files or accessing said data files directly.

9. The system of claim 1, further comprising a module that is operative to decrypt one or more data files that may be requested by a user as a result of reviewing said the report of analytic data utilizing the same encryption method used to encrypt the one or more data files.

10. The system of claim 9, where the one or more data files may be delivered to a user in either encrypted or decrypted format.

11. A method for secure data file analysis and access, comprising:
    receiving one or more data files from sources exterior to a first processor;
    creating a hash1 value for each keyword element of each data file;
    uploading each hash1 value into a blockchain structure;
    encrypting each hash1 value individually to create an encrypted data segment;
    creating a hashA value for each encrypted data segment and establishing a keyword element association between said hash1 and said hashA values;
    identifying and locating metadata associated with each hashA value, and
    analyzing said metadata for particular values to discover analytic information of interest to a user and creating a report of said analytic information for delivery to said user.

12. The method of claim 11, further comprising creating a string of association values to associate keywords in said hash1 with keywords in said hashA.

13. The method of claim 11, where the encryption of each data segment may be performed using public/private key, PGP, RSA, or any other encryption technology in use.

14. The method of claim 11, where each individual encrypted data segment is placed on one or more blockchains, each blockchain of which is a portion of the blockchain structure.

15. The method of claim 14, where each blockchain in the blockchain structure further comprises an echo key and grid table.

16. The method of claim 11, where the metadata associated with said hashA values provides a direct relationship with metadata associated with hash1 values.

17. The method of claim 16, where said analytic information of interest discovered when analyzing metadata associated with hashA values is directly related to hash1 values.

18. The method of claim 17, where said analytic information of interest may be applied to data files associated with hash1 values without decrypting said data files or accessing said data files directly.

19. The method of claim 11, further comprising decrypting one or more data files that may be requested by a user as a result of reviewing said the report of analytic data utilizing the same encryption method used to encrypt the one or more data files.

20. The method of claim 19, where the one or more data files may be delivered to a user in either encrypted or decrypted format.

* * * * *